(12) United States Patent
Garrett

(10) Patent No.: US 9,863,167 B1
(45) Date of Patent: Jan. 9, 2018

(54) LOCKING MECHANISM FOR AN INDIVIDUAL DRAWER OF A STORAGE VAULT UNIT FOR VEHICLES

(71) Applicant: Patrick Garrett, Bellingham, WA (US)

(72) Inventor: Patrick Garrett, Bellingham, WA (US)

( * ) Notice: Subject to any disclaimer, the term of this patent is extended or adjusted under 35 U.S.C. 154(b) by 0 days.

(21) Appl. No.: 15/275,704

(22) Filed: Sep. 26, 2016

(51) Int. Cl.
*E05B 65/44* (2006.01)
*E05B 15/16* (2006.01)
*B60R 7/14* (2006.01)

(52) U.S. Cl.
CPC ............... *E05B 65/44* (2013.01); *B60R 7/14* (2013.01); *E05B 15/1614* (2013.01)

(58) Field of Classification Search
CPC ........ B60R 7/14; E05B 65/44; E05B 15/1614
USPC ............ 70/77, 78, 81, 85, 86, 451; 292/346
See application file for complete search history.

(56) References Cited

U.S. PATENT DOCUMENTS

| 1,456,838 | A | * | 5/1923 | Voight | E05B 65/44 70/84 |
| 1,579,126 | A | * | 3/1926 | Maxwell | E05B 9/082 70/370 |
| 1,796,502 | A | * | 3/1931 | Boucher | E05G 1/005 109/51 |
| 1,937,425 | A | * | 11/1933 | Falk | E05B 59/00 292/74 |
| 2,201,957 | A | * | 5/1940 | North | E05B 13/108 70/216 |
| 2,262,140 | A | * | 11/1941 | Harvey | E05B 21/00 70/134 |
| 2,437,299 | A | * | 3/1948 | Jacobi | E05C 5/00 292/168 |
| 3,334,953 | A | * | 8/1967 | Becker | E05B 73/00 312/257.1 |
| 3,405,962 | A | * | 10/1968 | Sushan | E05B 17/2003 292/346 |
| 3,782,139 | A | * | 1/1974 | Rubner | E05C 1/16 292/169 |
| 3,827,773 | A | * | 8/1974 | Aiello | B62H 5/08 211/5 |
| 4,570,467 | A | * | 2/1986 | Greco | E05B 65/0894 292/346 |
| 4,609,233 | A | * | 9/1986 | Walla | E05B 65/462 292/141 |
| 5,003,727 | A | * | 4/1991 | Watten | E05B 15/0205 292/346 |
| 5,584,517 | A | * | 12/1996 | Simnacher | E05B 17/2088 292/340 |
| 5,657,652 | A | * | 8/1997 | Martin | E05B 55/12 70/107 |

(Continued)

*Primary Examiner* — Suzanne Barrett

(57) ABSTRACT

A locking mechanism for a vehicle storage vault includes an L shaped guard plate which is secured to a front member of a drawer part of a storage vault. A horizontal portion of the guard plate extends rearwardly of the drawer and has an opening therethrough. A lock is positioned inside the drawer and includes a bolt which is moveable by a user between a raised position and a lowered position. A receiving plate is attached to an under surface of a cabinet part of the storage vault, when the horizontal portion of the guard plate overlapping a center portion of the receiving plate. The receiving plate has an opening therethrough which is in registry with the opening in the guard plate and the lock bolt when the drawer is closed.

9 Claims, 5 Drawing Sheets

(56) References Cited

U.S. PATENT DOCUMENTS

| | | | | |
|---|---|---|---|---|
| 5,850,796 A * | 12/1998 | Cislo | ................... | F41C 33/06 |
| | | | | 109/51 |
| 5,905,446 A * | 5/1999 | Benore | .............. | G07C 9/00103 |
| | | | | 109/53 |
| 6,094,950 A * | 8/2000 | Maynard | ............. | E05B 65/0042 |
| | | | | 70/360 |
| 6,164,098 A * | 12/2000 | Hommes | ............. | E05B 63/0052 |
| | | | | 292/1 |
| 6,412,317 B1 * | 7/2002 | Martin | ................... | E05B 9/08 |
| | | | | 312/348.6 |
| 6,428,063 B1 * | 8/2002 | Bland | ................... | E05B 77/10 |
| | | | | 292/216 |
| 8,006,527 B2 * | 8/2011 | Nowakowski | ............ | E05B 9/08 |
| | | | | 292/340 |
| 2003/0010072 A1 * | 1/2003 | Lurie | ................ | E05B 17/2088 |
| | | | | 70/78 |

* cited by examiner

LOCKING MECHANISM FOR AN INDIVIDUAL DRAWER OF A STORAGE VAULT UNIT FOR VEHICLES

TECHNICAL FIELD

This invention relates generally to a locking mechanism for storage drawers and more particularly concerns a secure locking mechanism for drawers in a storage vault for firearms and the like wherein the storage vault is fittable to a motor vehicle, such as a car, truck or SUV.

BACKGROUND OF THE INVENTION

Storage vaults for vehicles, are generally well known. Typically, they are used to store firearms and other weapons securely. Such storage vaults are typically fittable into the cargo areas of motor vehicles, including cars, trucks and SUVs. Storage vaults are sold by different manufacturers, including Truckvault, Inc. of Sedro Woolley, Wash. A storage vault typically comprises a cabinet and one or more individual drawers which can be moved into the cabinet and withdrawn via a handle by a user. Each drawer typically can be individually locked, usually by a key, although other locking mechanisms can be used. It is important that the locking mechanism for the drawers be sturdy and secure in order to safeguard the firearms or other equipment contained therein. However, current locking mechanisms have proven to be readily breakable, sometimes with relatively little effort. Typically, the locks are broken by brute force.

Accordingly, it is desirable that a more secure locking mechanism be provided for the individual drawers of a storage vault used with motor vehicles.

SUMMARY OF THE INVENTION

Accordingly the present invention is a locking mechanism for a storage vault which fittable to a vehicle, comprising: an L shaped guard plate which is secured to a front member of a drawer part of a storage vault, wherein a horizontal portion of the guard plate extends rearwardly of the drawer from the front member and has an opening therethrough; a lock positioned inside the drawer, including a bolt which is moveable by a user between a raised position and a lowered position by a control member or handle accessible to the user; and a receiving plate which is attached to an undersurface of a cabinet part of the storage vault in which the drawer is positioned, wherein he receiving plate has an opening therethrough which is in registry with the opening in the guard plate and the lock bolt when the drawer is closed, so that the drawer can be locked when the bolt is moved to its raised position through the openings in the guard plate and the receiving plate.

BEST MODE FOR CARRYING OUT THE INVENTION

The present invention is a drawer locking mechanism which is used to securely fasten a drawer to a cabinet portion of a storage unit which is adapted for use in motor vehicles. The storage unit can be used to house firearms and other weapons or other equipment or valuables which must be maintained secure in a motor vehicle such as a car, truck or SUV. Such storage units, often referred to as vaults, are frequently used by law enforcement agencies to maintain security of firearms and other important equipment, including communication equipment. They are also used to store valuables. The storage vault comprises a cabinet portion and one or more individual drawers which are moved in and out of the cabinet by a user. When opened, the contents of the drawer are exposed.

Figure 1:
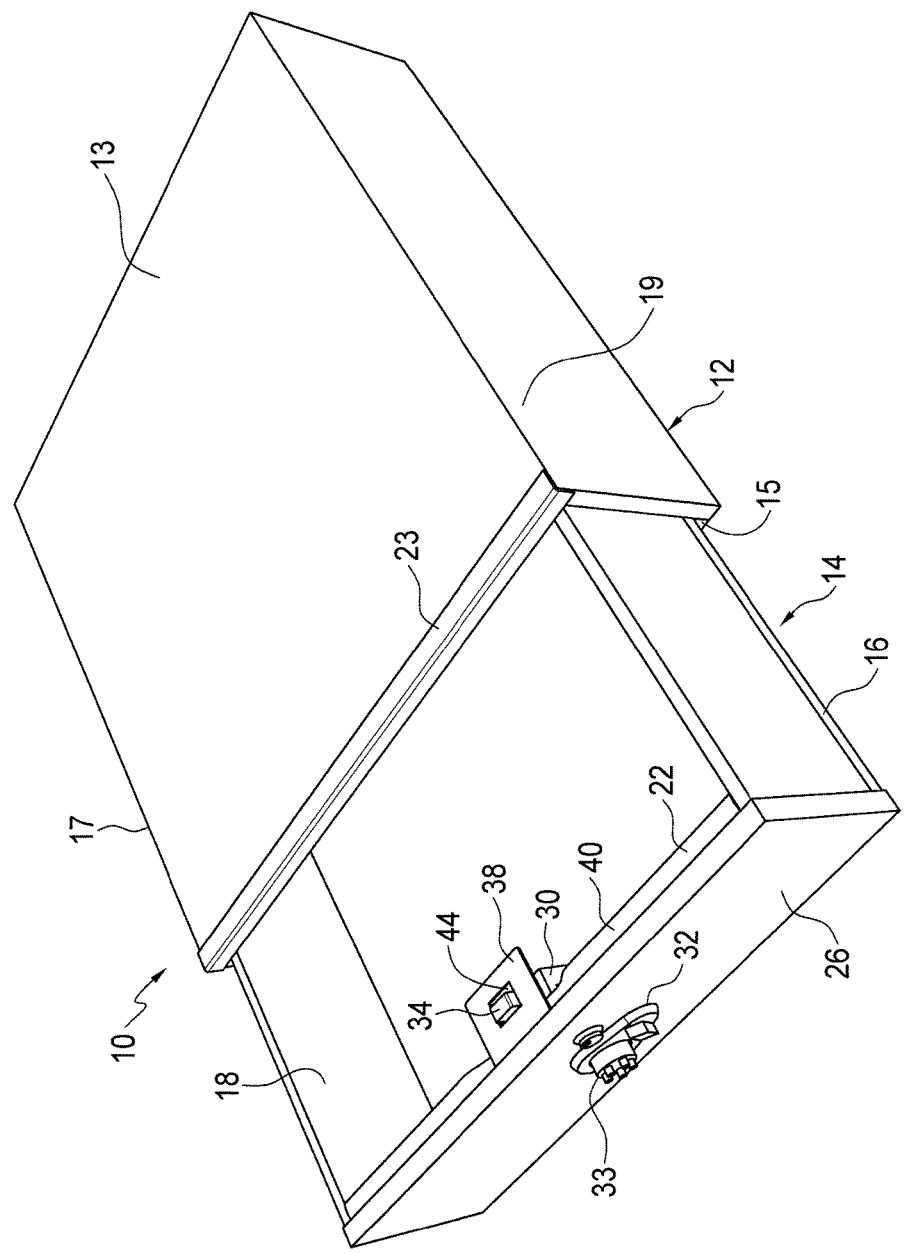
FIG. 1 is an isometric view of a storage vault with a drawer in an open condition, relative to the cabinet portion of the vault, showing a part of the drawer locking mechanism of the present invention.
Figure 2:
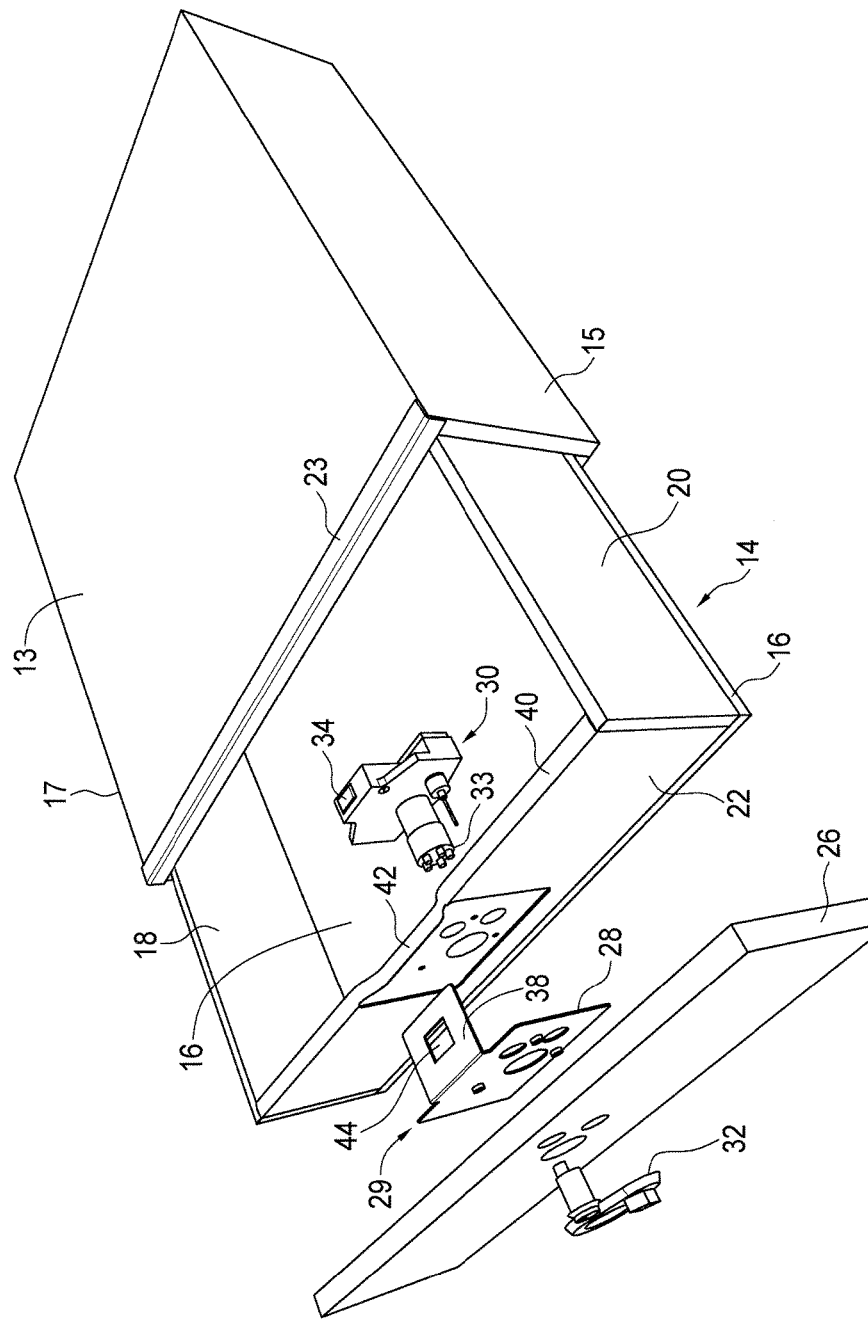
FIG. 2 is a partially exploded view of the drawer and locking mechanism of FIG. 1.

FIGS. 1 and 2 shows a storage vault unit 10 which includes a conventional cabinet portion 12. The cabinet portion can be made of various material including wood, metal or hard plastic or combinations thereof. Typical dimensions for a cabinet housing a single drawer are 40 inches long by 40 inches wide by 9 inches high. However these dimensions can be varied. The cabinet includes a top member 13, a bottom member 15, side members 17 and 19 and a rear member (not shown). Fittable in cabinet 12 in FIG. 1 is a drawer 14. Drawer 14 is moveable in and out of the cabinet 12 by conventional drawer glides or other mechanisms. The drawer includes a bottom member 16, opposing side members 18 and 20, a front member 22 and an opposing rear member (not shown). The drawer is open at the top, exposing the contents thereof when it is in an open position, as shown in FIGS. 1 and 2. The embodiment shown also includes a front piece 26 having the same configuration as the front member 22 of the drawer 14 and an L shaped element 23 positioned at the upper forward edge of the cabinet. Element 23 is typically made of metal and stiffens the front edge of the cabinet.

Securing the front piece 26 and the front member 22 together with a vertical portion 29 of a guard plate 28 is a lock 30. Lock 30 is positioned in drawer 14, with a handle portion 32 extending outwardly from front piece 26. The lock includes a bolt 34 which extends between a raised position and a lowered position, by action on a rotatable handle 32. The lock 30 can be operated (locked/unlocked) by a key or a push button combination on assembly 33. Different lock arrangements can be used, however.

The vertical portion 29 of guard plate 28 is positioned between front member 22 of the drawer and front piece 26. The front member 22 of the drawer, the vertical portion 29 of guard plate 28 and the front piece 26 all include openings in registry for an extending portion of the lock, including the push button assembly and attachment elements such as bolts which secure the front member, the front piece and the vertical portion of the guard plate firmly together.

The guard plate also includes a horizontal portion 38 which extends inwardly of the drawer a slight distance below upper edge 40 of the front member 22 thereof. Upper edge 40 of the front member has a slight cut out portion 42 which allows the horizontal portion 38 to be positioned slightly below the remaining part of edge 40 or coplanar there with. The horizontal portion 38 in the embodiment shown is approximately 3¼ inches by 2⅜ inches and includes an opening 44 which accommodates the movement of bolt 34 therethrough. When the drawer is closed as shown in FIG. 1, the opening 44 in the horizontal leg portion is in registry with the bolt 34 of the lock, allowing the bolt to extend through opening 44 when it is in its raised position.

Figure 3:
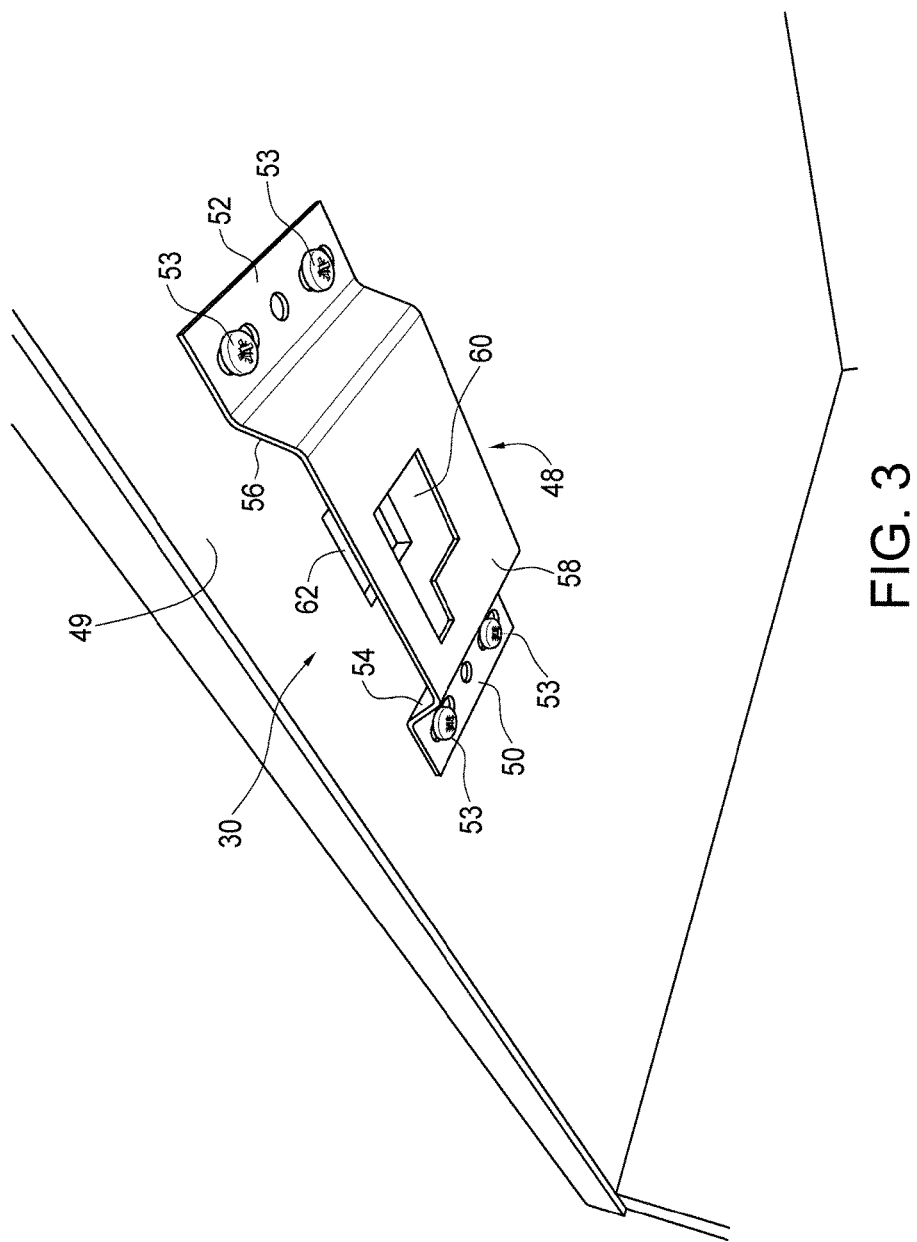
FIG. 3 is a perspective view of another part of the drawer locking mechanism of the present invention.

FIG. 3 shows the other portion of the locking mechanism of the present invention, namely, a metal receiving plate 48 which is connected to the underside 49 of the top member 13 of cabinet 12. The receiving plate 48 is attached to the top member by means of screws 53-53 or similar elements. The receiving plate 48 includes two opposing substantially identical side portions 50 and 52 which are connected securely to the cabinet top member. Extending toward each other from the side portions 50 and 52 are two substantially identical angled portions 54 and 56. Connecting the two angled portions 54 and 56 is a flat intermediate portion 58. Flat portion 58 includes an opening 60 therethrough which is configured to permit the bolt 34 of the lock to move therethrough. In the embodiment shown, when the receiving plate is attached to the underside of the cabinet top, there is a distance of approximately ¾ inch between the cabinet undersurface 49 and the flat portion 58. In the embodiment shown, flat portion 58 is approximately 3 inches wide by 2½ inches long, although these dimensions can be varied.

Figure 5:
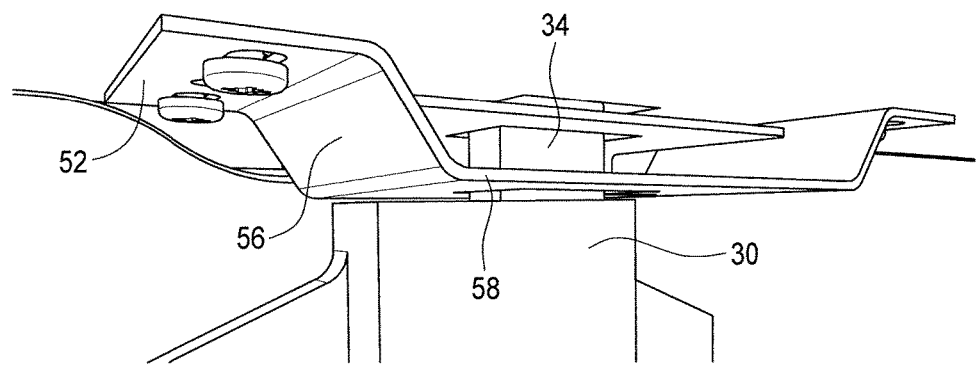
FIG. 5 is a perspective view showing the drawer locking mechanism in a locked condition in a cabinet portion of a storage vault.
Figure 6:
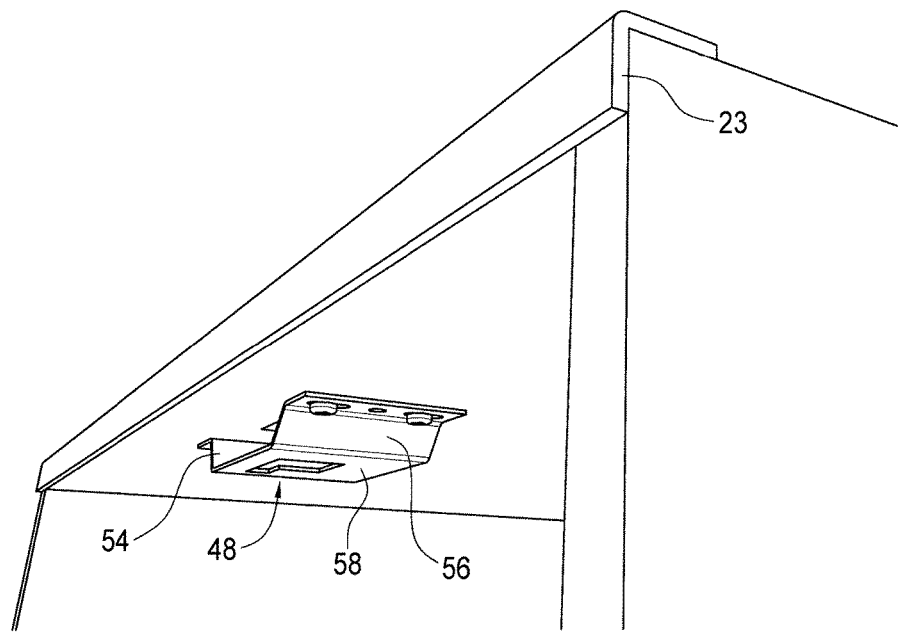
FIG. 6 is a perspective view of a portion of the cabinet portion of a storage vault.

When the drawer is in its closed position, the horizontal portion 38 of guard plate 28 overlaps flat portion 58, between flat portion 58 and cabinet undersurface 49. Opening 44 of horizontal portion 38 and opening 60 of flat portion 58 of receiving plate 48 are in registry to receive the lock bolt therethrough The underside of the cabinet top member includes a routed opening 62, having dimensions which accommodate the bolt of the lock therein, in registry with opening 60 of the flat portion. Accordingly, when the bolt is in its uppermost raised position it extends through opening 60 in the receiving plate, opening 48 in the overlapping guard plate and into routed opening 62 in the cabinet top, as shown in FIG. 5. The routed opening 62 does not extend through the cabinet top; but rather partially into the cabinet top, as shown in FIGS. 3 and 5. The combination of the receiving plate and the overlapping guard plate portion, with the bolt extending therethrough into the cabinet top, results in a secure locking of the drawer which is very difficult to break. Access to the internal portion of the drawer is thus substantially prevented.

Figure 4:
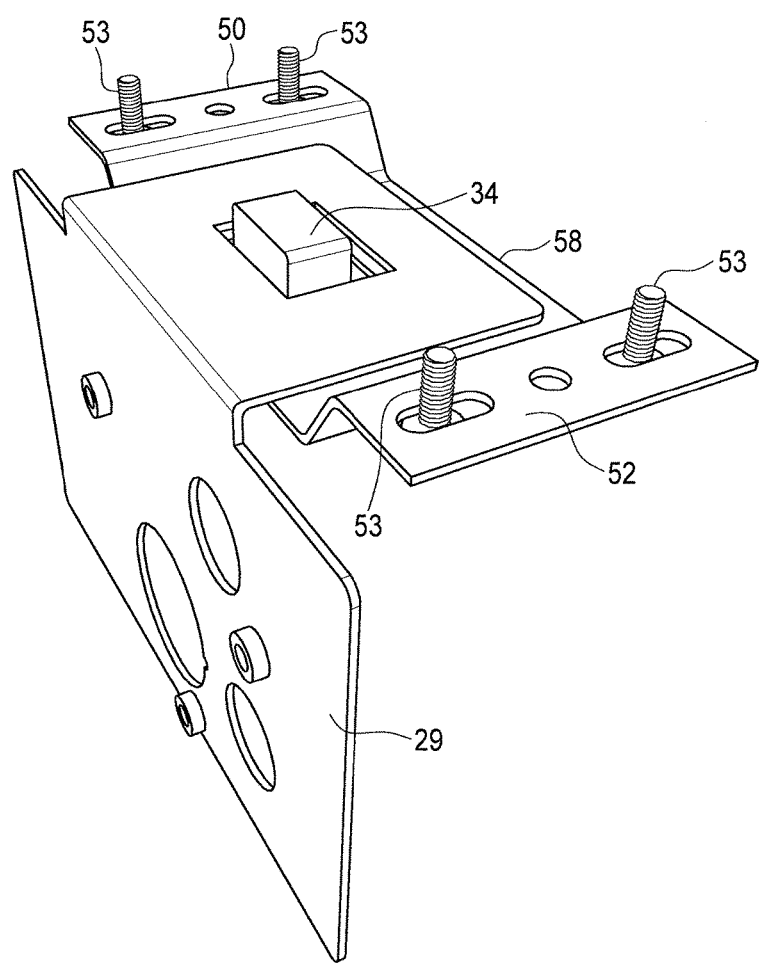
FIG. 4 is a perspective view of the entire drawer locking mechanism, separate from the drawer.

In operation, the user with a key (or by a push button combination), unlocks the lock, which permits the handle 32 to be rotated to lower the bolt, so that the drawer can be moved in and out relative to the cabinet. In one handle position the bolt is in a lowered position as shown in FIG. 1, while the bolt in a raised position is shown in FIGS. 4 and 5.

As indicated above, the guard plate 29 is securely fixed between the front piece and the front member of the drawer while the receiving plate 48 is securely attached to the under surface of the cabinet. Both pieces are typically made of metal. This arrangement results in a very secure locking mechanism for the drawer.

Although a preferred embodiment of the invention has been disclosed here for purposes of illustration, it should be understood that various changes, modifications and substitutions may be incorporated in the embodiment without departing from the spirit of the invention which is defined by the claims which follow:

What is claimed is:

1. A locking mechanism for a storage vault which is fittable to a vehicle, comprising:
    an L shaped guard plate which is secured to a front member of a drawer part of a storage vault, wherein a horizontal portion of the guard plate extends rearwardly of the drawer from the front member, and has an opening therethrough;
    a lock positioned inside the drawer, including a bolt which is moveable by a user between a raised position and a lowered position by a control member or handle accessible to the user; and
    a receiving plate which is attached to an undersurface of a cabinet part of the storage vault in which the drawer is positioned, wherein the horizontal portion of the guard plate extends between the undersurface of the cabinet part and the receiving plate when the drawer is closed and wherein the receiving plate has an opening therethrough which is in registry with the opening in the guard plate and the bolt when the drawer is closed, so that the drawer can be locked when the bolt is moved to its raised position through the openings in the guard plate and the receiving plate.

2. The locking mechanism of claim 1, wherein the bolt is raised and lowered by user action with a key or push button assembly operable in the control member or handle.

3. The locking mechanism of claim 1, wherein the cabinet part undersurface includes a routed out portion in registry with the openings in the guard plate and the receiving plate when the drawer is closed and wherein the lock bolt in its raised position extends through the openings and into the routed out portion of the cabinet part undersurface.

4. The system of claim 1, wherein the guard plate and the receiving plate are metal.

5. The locking mechanism of claim 1, including a front piece having the same configuration as the front member of the drawer and positioned in registry therewith, wherein the lock secures the front member, the front piece and a vertical portion of the guard plate therebetween by attachment elements which extend through the front member, the front piece and the vertical portion of the guard plate.

6. The system of claim 1, wherein the receiving plate includes two side portions which are attached to the cabinet part undersurface and a lower intermediate portion having the receiving plate opening therethrough, such that there is a separation between the lower intermediate portion and the cabinet part undersurface, allowing the bolt to extend above the lower intermediate portion when the bolt is in its raised position.

7. The system of claim 1, wherein a top edge of the drawer includes a cut out portion so that the horizontal portion of the guard plate does not extend above a remainder of a top edge of the drawer.

8. The system of claim 1, wherein a horizontal portion of the guard plate overlaps a portion of the receiving plate and wherein the openings in the guard pate and the receiving plate are in registry when the drawer in closed.

9. The system of claim 1, wherein a front top edge of the cabinet includes an L shaped bracing member attached thereto.

\* \* \* \* \*